Aug. 14, 1956   C. A. STICKEL   2,758,684
COMBINED MOTOR AND BRAKE CONTROL
Filed Feb. 28, 1952   2 Sheets-Sheet 2

INVENTOR.
Carl A. Stickel
BY Willits Hardman and John
Attorneys

United States Patent Office 2,758,684
Patented Aug. 14, 1956

2,758,684

COMBINED MOTOR AND BRAKE CONTROL

Carl A. Stickel, Dayton, Ohio, assignor to General Motors Corporation, Dayton, Ohio, a corporation of Delaware Application February 28, 1952, Serial No. 274,003

2 Claims. (Cl. 192—3)

This invention relates to vehicles and more particularly to an improved and simplified system for retarding the motion of vehicles.

In automobiles having a conventional gear transmission providing a direct mechanical connection between the engine and the wheels, the engine provides a considerable retarding or braking force until the clutch is disengaged. Where automatic transmissions are used particularly those having hydraulic fluid couplers or hydraulic torque converters there is no direct connection between the wheels and the engine but at higher speeds these hydraulic elements provide considerable driving of the engine by the wheels. This driving of the engine by the wheels, however, falls off rapidly as the car speed is reduced and at speeds below 15 or 20 miles an hour very little braking or retarding action is provided by the closing of the throttle of the engine.

As a consequence, in traffic there is a greater amount of braking required with the automatic transmission than with conventional gear transmissions. This requires considerable transfer of the right foot from the accelerator pedal to the brake pedal and back again when driving in traffic. There is also some tendency for the automobile when stopped to creep whenever the engine is in operation. Some persons learn to use the left foot for braking but at present the brake pedal is placed so as to be primarily used by the right foot since everyone is accustomed to this.

It is an object of my invention to provide a suitable pedal control by which the engine can be controlled in a manner very similar to the conventional accelerator pedal while power braking can be obtained by reverse operation of this pedal.

It is another object of my invention in which the time of change from acceleration to braking can be greatly reduced and safety increased.

It is another object of my invention to provide a simple retarding system for vehicles which makes use of the hydraulic pumping system of the automatic transmission.

It is another object of my invention to provide a convenient arrangement whereby the operator of a vehicle can close the outlet of a hydraulic pump connected to the rear wheels to retard the motion of the automobile.

It is another object of my invention to provide a power braking system which is operated under control of the operator of the vehicle by hydraulic pressures created in the automatic transmission.

It is another object of my invention whereby the creeping of the automobile at traffic lights can readily be controlled.

These objects are attained first by providing a pedal which will fit the foot of the operator and which is pivoted beneath the arch of the operator's foot so that the operator can tilt the pedal forwardly with his toe or in the opposite direction with his heel. Beneath the toe portion of the pedal there is provided an operating connection with the throttle of the engine so that by pressing forwardly the throttle is opened in the same manner as is customary with the conventional accelerator pedal.

When the operator desires to brake or retard the motion of the automobile, he presses downwardly with the heel of his foot so that the engine throttle is closed and a second operating mechanism is operated which operates a hydraulic valve mechanism which controls a hydraulic power braking system.

In one form this second operating mechanism moves an hydraulic valve which connects the hydraulic pressure system of the automatic system with a power braking cylinder which operates the braking mechanism on the four wheels of the automobile. When the pressure of the heel on the pedal is released the valve reconnects the brake operating cylinder with the suction system of the hydraulic circuit of the automobile transmission so that the brakes are released.

In another form of the invention this second operating mechanism operated by pressing the heel upon the bottom of the pedal is used to close the outlet of the rear pump of the automatic transmission which is connected and driven by the rear wheels of the vehicle. This retards the rotation of the rear wheels. However, at present such pumps are not made large enough to fill all the braking requirements of the vehicle, but this is particularly suited for braking upon slippery surfaces such as wet pavements, ice and snow. It is also useful particularly at car speeds of 20 m. p. h. or less for providing a gradual stop at traffic lights and stop streets.

In the third form of the invention the second operating mechanism also closes the outlet of the rear pump of the automatic transmission but the pressure developed by the pump is used to operate the power cylinder of the four wheel braking system of the automobile.

Further objects and advantages of the present invention will be apparent from the following description, reference being had to the accompanying drawings, wherein a preferred form of the present invention is clearly shown.

Figure 1:
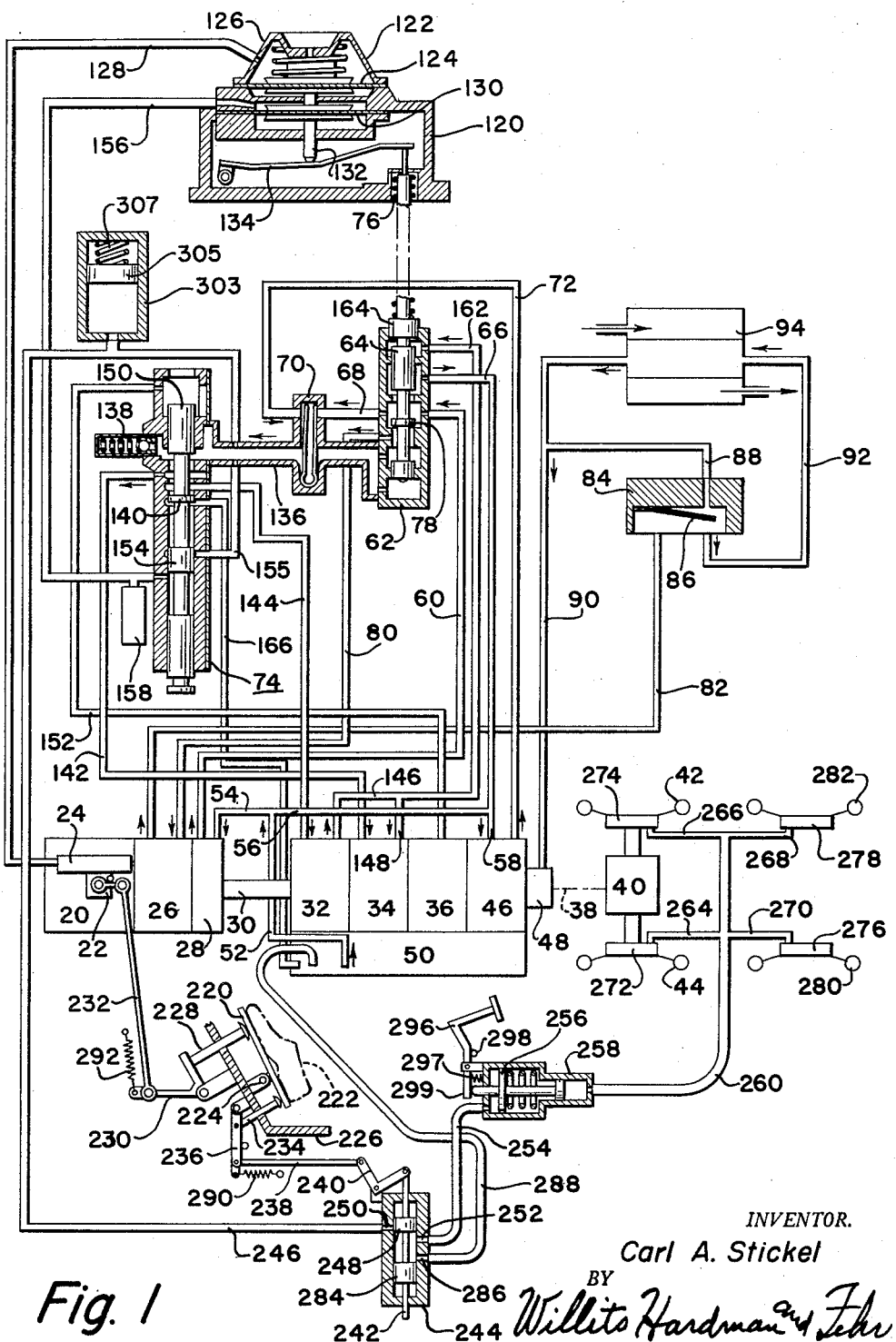
Figure 1 is a diagrammatic illustration of a vehicle having a torque converter transmission embodying one form of my improved retarding system.

Referring now to the drawings and more particularly to Figure 1, the invention is shown diagrammatically as applied to a Chevrolet 1951 powerglide automobile such as is described in the 1950 and 1951 supplement to the 1949 Chevrolet Passenger Car Shop Manual. The hydraulic torque converter system is illustrated and described on pages 29 to 85 of the supplement. These shop manuals are referred to for a more complete disclosure of the parts of the car to which the invention is applied.

In Figure 1 there is shown diagrammatically a gasoline engine 20 with which there is shown diagrammatically a carburetor 22 and an intake manifold 24. The engine 20 is directly connected to the pump of a hydraulic torque converter 26 and to the front oil pump 28. This oil pump 28 is preferably of a positive displacement type such as an internal-external gear pump as illustrated in the above identified manuals. The turbine of the hydraulic torque converter 26 is connected by a shaft 30 with a hydraulic clutch 32, a hydraulic low gear mechanism 34 and a hydraulic reverse gear mechanism 36. In this mechanism only the clutch 32 is engaged for direct drive while only the low gear mechanism is actuated when low gear is desired and only the reverse gear mechanism 36 is actuated when it is desired to reverse the car. Their outputs are connected through the propeller shaft 38 with the differential 40 on the rear axle carrying the rear wheels 42 and 44. Also connected to the propeller shaft 38 within the transmission is the rear oil pump 46 which rotates with the propeller shaft 38. This rear oil pump is of the positive displacement type such as an internal-external gear pump as illustrated in the previously identified manuals. There is also diagrammatically indicated the lubricating system 48 which lubricates the clutch, low and reverse gears, in the transmission. This lubricating system 48 discharges into the sump 50 of the transmission shown diagrammatically beneath the clutch 32, low 34, reverse 36 and the rear pump 46 elements.

Oil is drawn from the sump 50 through the suction pipe 52 and the branch suction pipe 54 by the front oil pump 28 whenever the engine 20 is operating. Oil is also drawn through the suction pipe 52 and the branch pipes 56 and 58 by the rear oil pump 46 whenever the propeller shaft 38 is operated in the direction of rotation for forward operation of the car. The front oil pump 28 delivers oil through a pipe 60 to the pressure regulator valve 62, the pipe 68 connecting directly with the dual check valve 70 which includes a wide hair pin shaped steel spring fitted into a narrow slot of the valve body. This spring is sprung so as to spread and cover the two opposed inlet holes. One of these inlet holes connects directly with the pipe 68 while the opposite inlet hole connects with the discharge pipe 72 of the rear oil pump 46.

The foregoing description and the parts of the diagrammatic drawing described are intended merely as one example of an automobile provided with an automatic transmission in which there is a front oil pump connected directly to the engine and a rear oil pump connected directly to the wheels to supply an oil pressure in the automatic transmission system whenever either the engine is in operation or the car is in operation to which my invention can be conveniently applied.

According to my invention, I provide a control for such an automobile by which the engine can be controlled to drive the car or the brake mechanism can be actuated to stop the car with a minimum interval between them by using only one foot which remains on one pedal continuously during the operation of the car in either direction for either purpose. To do this I provide a pedal 220 of such length and width as to support the entire foot of the average driver. This pedal 220 receives a foot 222 as indicated in a dot and dash outline. Substantially beneath the arch of the driver's foot the pedal 220 is provided with a pivoted connection 224 with the floor boards 226 so that by pressing toward the floor boards 226 with the toe the pedal 220 can be rocked forwardly or counterclockwise, while by pressing downwardly upon the pedal 220 with the heel the pedal 220 can be rocked rearwardly or clockwise with relative ease and quickness. The rocking of the pedal 220 downwardly or counterclockwise acts through the pin 228, the bell crank lever 230 and the rod 232 which connects with the throttle lever of the carburetor 22 to gradually open the throttle as the pedal 220 is moved farther in the forward or counterclockwise direction in a manner similar to the conventional accelerator pedal.

My invention avoids the difficulty and the time lost in transferring the right foot from the accelerator pedal to the brake pedal in the conventional arrangement. According to my invention, when the pedal 220 is pressed rearwardly or clockwise by the heel of the operator, a pin 234 is engaged by the lower end of the pedal to operate the lever 236, the rod 238 and the bell crank lever 240 which connects to the valve stem 242 of the hydraulic control valve 244. This hydraulic control valve 244 is supplied with oil from the portion of the hydraulic system which is supplied with oil under pressure from either or both of the oil pumps. This is provided by the brake valve supply pipe 246 which connects with the pipe 136 which provides a connection between the dual check valve 70 and the manual control valve 74. The valve stem 242 is provided with a valve element 248 which normally closes the port 250 to which the pipe 246 connects. The valve 244 also has an outlet port 252 which is always uncovered and which connects with the pipe 254 connecting to the interior of a fluid motor or hydraulic relay in the form of a large cylinder 256 containing a piston which is directly connected to a smaller piston in a smaller brake actuating cylinder 258.

This brake actuating cylinder 258 is a part of a hydraulic braking system in which the cylinder 258 is connected by the pipes 260, 264, 266, 268 and 270 with the individual actuating cylinders of the respective friction brakes 272 and 274 on the rear wheels 44 and 42 and the brakes 276 and 278 on the front wheels 280 and 282 of the automobile. These hydraulically actuated friction brakes 272 to 278 on the four wheels 44, 42, 280 and 282 may be like the brake illustrated in the Ayres et al. Patent 2,294,329, issued August 25, 1942. The valve stem 242 is provided with a second valve element 284 which when the valve element 248 is moved upwardly to uncover the port 250 will move to close a port 286 connecting with a pipe 288 discharging into the sump 50. To release the brakes, the pedal 220 is returned to the position shown in Figure 1 in which it is out of engagement with both the actuating pins 228 and 234. In this position the automobile is substantially free from either the application of power or braking. A return spring 290 is applied to the lever 236 or some other part of the valve actuating linkage to return the valve stem 242 to the position shown in Figure 1 in which the port 250 is recovered and the port 286 is uncovered so that the interior of the fluid motor of the cylinder 256 is connected by the pipe 254, the metal chamber of the valve 244 and the discharge pipe 288 with the sump 50 to instantly release the pressure on the system.

The throttle control mechanism is also provided with a return spring 292 which yieldingly urges the throttle of the carburetor 22 to its closed position. This foot pedal control therefore provides arrangement by which one foot remaining continuously on the pedal can be moved forwardly to open the throttle or rearwardly to apply the brakes instantaneously to any extent desired with ease and precision. By using the heel to control the power operated braking system, there is a much greater sensitiveness in the amount of braking applied. It is coordinated with the established habit of lifting up on the accelerator pedal to slow down the car. It is very convenient for stopping the creeping of the car when standing at a traffic light.

To provide a means for preventing movement of the car when the car is stationary and the engine is not in operation, as an auxiliary to the power cylinder 256 there is provided another foot pedal 296 which may be shaped similar to an ordinary brake pedal. It is normally pressed by a spring 297 against a stop 298 so that the power brake cylinder 256 will normally operate without movement of the brake pedal 296. However, when it is desired to manually operate the braking system, the brake pedal may be depressed to cause the lower end portion 299 of the pedal to engage a pin protruding from the piston within the cylinder 256 through the end wall of the piston chamber so that the piston within the brake cylinder 258 is actuated to apply the brakes 272, 274, 276 and 278.

To insure that there is an adequate supply of oil under pressure for operating the brake cylinder 256 at all times, as an optional feature there is connected to the pipe 246 a pressure chamber 303 containing a piston 305 which is urged by a spring 307 to empty the contents of the chambers 303 into the pipe 246 at all times. This acts as a resilient storage chamber which insures against a sudden reduction in oil pressure in the system when the brakes are applied.

Thus the pedal 220 provides a position shown in Figure 1 in which the car will roll without either a driving force from the engine or a braking force on the wheels and it can be operated to provide any amount of engine power for driving or any amount up to the amount of maximum braking power on the four wheels.

Figure 2:
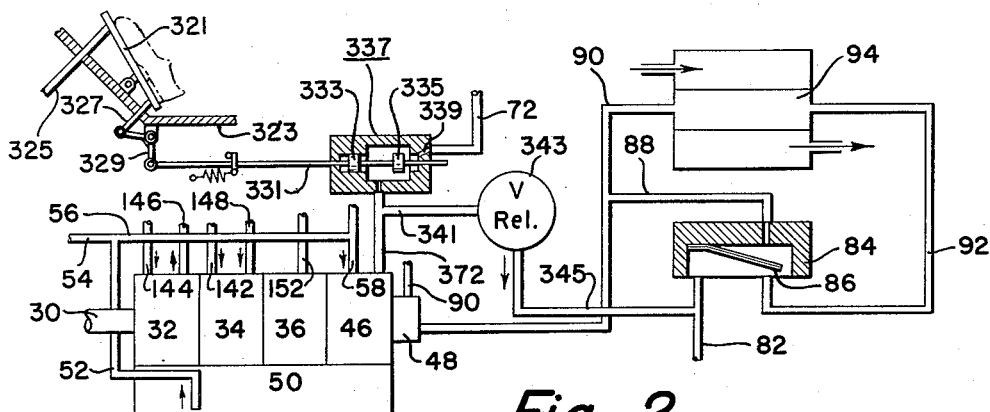
Figure 2 shows diagrammatically a second form of improved retarding system in which only the parts differing from Figure 1 are shown.

In Figure 2 there is shown a similar accelerator pedal 321 pivoted under the arch of the foot to the floor boards 323 in a manner to the pedal 220 of Figure 1. Connected to the pedal 321, adjacent the toe portion is a transmitting element 325 for operating the throttle upon an engine corresponding to the engine 20. Adjacent the heel portion of the pedal 321 there is provided an operating pin 327 which through a bell crank lever 329 and the valve rod 331 operates the balanced valve elements 333 and 335 in the valve body 337. The chamber within this valve 337 is connected to the outlet pipe 372 which connects to the outlet of the rear oil pump 46 in Figure 1. The clutch 32, the low gear mechanism 34, the reverse gear mechanism 36, the rear oil pump 46 and the lubricating system 48 as well as the sump 50 are designated by the same reference characters and are identical to the same elements in Figure 1. The balanced valve arrangement within the valve body 337 is adapted to open and close the outlet 339 in the valve body which connects to the pipe 72 in Figure 1 and this pipe is so designated in Figure 2.

When the pedal 321 is in the position shown in Figure 2 or when it is pressed forwardly or in the counterclockwise position to open the throttle of the engine, the valve element 335 is in the open position allowing free flow of oil from the outlet of the rear oil pump 46 which is connected directly to the propeller shaft 38 and rotates with this propeller shaft 38. However, when the pedal 321 is pressed downwardly in the clockwise direction by the heel, the pin 327 will be depressed to pivot the bell crank lever 329 in the counterclockwise direction to move the rod 331 to the right so that the valve element 335 closes the outlet to the valve body 337. The closing of the outlet of the rear pump 46 (which is a positive displacement type pump preferably of the internal external gear type) causes the rotation of the elements in the pump to be resisted thereby opposing the rotation of the propeller shaft, the rear axle and the rear wheels to provide a retarding effect upon the movement of the car.

In automobiles equipped with hydraulic torque converter automatic transmissions there is less engine braking at higher speeds than when a manual shaft transmission is used. This engine braking falls off rapidly as the car speed is reduced so that there is very little engine braking at speeds of less than 20 miles per hour. This requires considerable use of the brake when frequent stops are necessary in traffic. The braking system shown in Figure 2 provides a smooth braking system of great convenience which will gradually bring the car to a smooth stop especially in traffic without the necessity of using the conventional foot brake except when quick braking is required. It also provides a smooth form of braking for slippery pavements.

In order that the pressures at the outlet of the rear oil pump and the outlet pipe 372 do not become excessive there is provided a pipe 341 connecting the outlet pipe 372 with a pressure relief valve 343 which may be set at a very high but safe limit such as 3000 or 4000 pounds per square inch. It should be understood that the pump will not normally operate at such pressures and such pressures will likely occur only when the balance valve 337 is closed suddenly at relatively high speeds. The outlet of this pressure relief valve 343 is connected by the pipe 345 to the thermostatic by-pass valve 84 along with the pipe 82 from the outlet of the torque converter 26. In this way any heat put into the oil by the rear pump during the use of it for braking will be conducted to the oil cooler 94 so that the oil is cooled before it is returned to the lubricating system 48.

Figure 3:
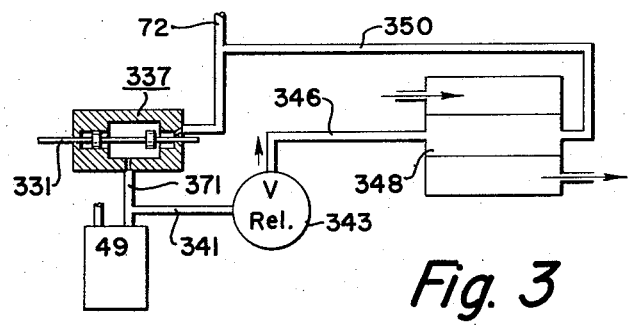
Figure 3 is a diagrammatic illustration of a third form of the invention in which only the parts differing from Figures 1 and 2 are shown.

In Figure 3 is shown a modification of Figure 2 in which the rear oil pump 46 is similarly connected to the balanced valve 337 which has its outlet connected to the pipe 72. In this form, the pressure relief valve 343, which is connected to the outlet pipe 371 by the pipe 341, has its outlet connected by a pipe 346 with a separate oil cooler 348 provided with cooling water and having its outlet connected by a pipe 350 with the pipe 72 which connects to the dual check valve 70.

Figure 4:
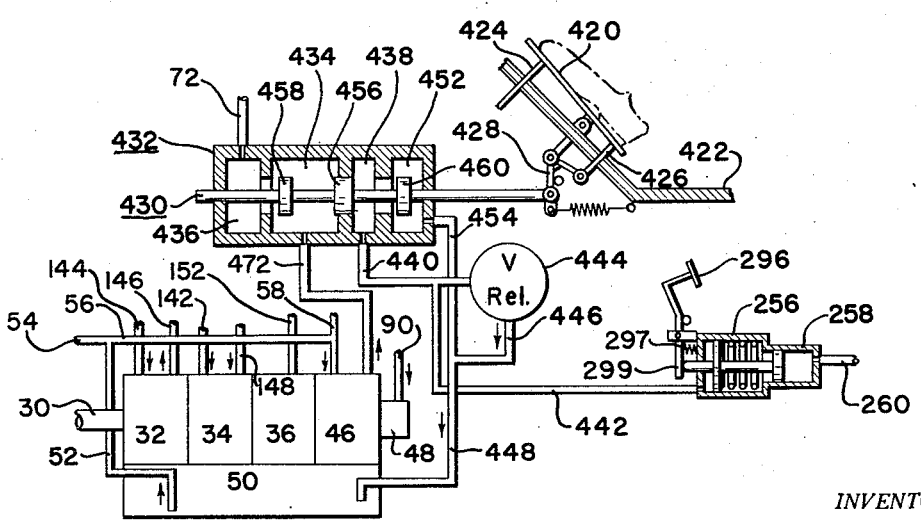
Figure 4 is a diagrammatic view showing a fourth form of the invention in which only the parts differing from the previous figures are shown.

In Figure 4 there is shown a pedal 420 similar to the pedal 220 shown in Figure 1 and similarly pivoted at a point beneath the normal location of the arch of the driver's foot to the floor boards 422. Beneath the toe portion of the pedal 420 is a rod 424 which connects with the throttle lever of the carburetor 22 of the engine 20 as in Figure 1. The heel portion of the pedal 20 is connected by the rod 426 and the bell crank lever 428 to the valve stem 430 of a balanced valve 432. The outlet of the rear pump 46 is connected by a pipe 472 to the middle chamber 434 of the valve 432. The valve 432 has an outlet chamber 436 to which connects the pipe 72 as shown in Figure 1. The valve 432 upon the opposite side of the chamber 434 has a chamber 438 which is connected by the pipes 440 and 442 with the fluid motor provided in the power cylinder 256 which operates the brake actuating cylinder 258 connected to the brake connecting tube 260 as shown in Figure 1. This provides a means for actuating the four wheel braking system directly by pressure from the rear pump 46.

A pipe 440 also connects directly with a pressure relief valve 444 which may be set at a lower pressure than pressure relief valve 343. The pressure relief valve 444 discharges through the pipes 446 and 448 into the sump 50. The valve 432 has a fourth chamber 452 which is connected by the pipe 454 and the pipe 448 with the sump 50. The valve stem 430 is provided with an element 456 which closes communication between the chambers 434 and 438 when the pedal 420 is in non-braking position. Also in this position, the valve element 458 is in the open position allowing the outlet pipe 472 of the rear pump 46 to be connected through the chambers 434 and 436 with the pipe 72. There is also provided a third valve element 460 upon the valve stem 430 which is open in the non-braking position to connect the chambers 438 and 452. This causes the fluid motor in the brake power cylinder 256 to be connected by the pipes 442 and 440 through the chambers 438 and 452 with the pipes 454 and 448 connecting directly with the sump 50 so that pressure is relieved within the braking power cylinder 256.

When it is desired to apply the brakes, the heel of the pedal 420 is depressed to turn the pedal 420 in the clockwise position so that the pin 426 is pushed downwardly to shift the bell crank lever 428 in the clockwise direction to move the valve stem 430 to the left to cause the valve element 458 to close the apertures between the chambers 434 and 436. At the same time the valve element 460 closes the aperture between the chambers 438 and 452 while the valve element 456 opens the aperture between the chambers 434 and 438. This causes the oil being delivered from the rear pump 46 when the car is in motion forwardly to be conducted through the pipe 472, the chambers 434 and 438 and the pipes 440 and 442 to the fluid motor in the power cylinder 256 of the four wheel brake mechanism to apply the brakes on all four wheels. When the pedal 420 is moved in the opposite direction, the pressure is relieved within the braking power cylinder 256 to release the brakes.

Thus I have provided several systems in which power braking can be readily obtained under the control of the same pedal which is used to control the engine. The power braking is provided by controlling the fluid in the hydraulic oil system of an automatic transmission which may be of any type having a positive displacement type of rear oil pump connected by the propeller shaft to the driving wheels of the car. Safety is greatly increased by the quickness, sureness, and power of application of the braking system. The system will prevent such accidents as occur when the foot accidentally slips off the brake pedal onto the accelerator pedal.

While the form of embodiment of the invention as herein disclosed constitutes a preferred form, it is to be understood that other forms might be adopted, as may come within the scope of the claims which follow.

What is claimed is as follows:

1. In a vehicle having driving means and wheels, a hydraulic pump connected to and driven by a wheel, a second hydraulic pump connected to and driven by said driving means, a hydraulic circuit including a suction inlet system connected to the inlets of both of said pumps and a pressure outlet system connected to the outlets of said pumps, a friction type braking means for the wheels of said vehicle, a hydraulic fluid motor for operating said braking means, a rockable pedal pivoted at an intermediate point, a controlling device for controlling the driving means operably connected for actuation by the forward movement of the pedal, a valve means having alternate substantially unrestricted connections with said suction inlet system and said pressure outlet system, an hydraulic relay having a connection with said first mentioned hydraulic motor for changing the amount of fluid in said motor, said valve means having a hydraulic connection with said hydraulic relay, means connecting said valve means for actuation to an alternate position connecting said hydraulic relay to said pressure outlet system upon a reverse movement of said pedal, said last named connecting means including means for moving said valve means to a normal position connecting said relay with said suction inlet system upon forward movement of said pedal, and a separate foot pedal having a one-way lost motion connection with said hydraulic relay for actuating said hydraulic relay independently of said valve means.

2. In a vehicle having driving means and wheels, and a hydraulically controlled transmission means connecting said driving means and wheels, said transmission means including a hydraulic pump connected to and driven by a wheel, a second hydraulic pump connected to and driven by said driving means, a hydraulic circuit containing oil and including a suction inlet system connected to the inlets of both of said pumps and a pressure outlet system connected to the outlets of said pumps, a resilient pressure storage reservoir operably connected to said pressure outlet system having means for delivering hydraulic fluid under pressure to said pressure outlet system, check valve means preventing reverse oil flow from said outlet system through said pumps, a friction type braking means for the wheels of said vehicle, a separate self contained hydraulic system, a hydraulic fluid motor for operating said braking means, a rockable pedal pivoted at an intermediate point, a controlling device for controlling the driving means operably connected for actuation by the forward movement of the pedal, and hydraulic connecting means including a valve means having substantially unrestricted connections with said suction inlet system and said pressure outlet system and normally positioned for connecting said fluid motor in a substantially unrestricted connection with said suction inlet system, said valve means having an alternate position connecting said fluid motor in a substantially unrestricted connection with said pressure outlet system, and means responsive to a reverse movement of said pedal for moving said valve means to said alternate position.

References Cited in the file of this patent

UNITED STATES PATENTS

| | | |
|---|---|---|
| 1,938,979 | Sawtelle | Dec. 12, 1933 |
| 2,001,585 | Roeder | May 14, 1935 |
| 2,033,433 | Leupold | Mar. 10, 1936 |
| 2,073,772 | Winters | Mar. 16, 1937 |
| 2,259,810 | Freeman | Oct. 21, 1941 |
| 2,287,301 | Freeman | June 23, 1942 |
| 2,294,329 | Ayres et al. | Aug. 25, 1942 |
| 2,304,560 | Freeman | Dec. 8, 1942 |
| 2,328,684 | Schnell | Sept. 8, 1943 |
| 2,363,977 | Kucher | Nov. 28, 1944 |
| 2,547,578 | Holmes | Apr. 3, 1951 |
| 2,588,866 | Moon | Mar 11, 1952 |